Patented Nov. 11, 1941

2,262,246

UNITED STATES PATENT OFFICE 2,262,246

PURIFICATION OF ALKALI METAL HYDROXIDE SOLUTIONS

Irving E. Muskat and Frederick Gage, Akron, Ohio, assignors to Pittsburgh Glass Company, Allegheny County, Pa., a corporation of Pennsylvania No Drawing. Application November 2, 1939, Serial No. 302,563

5 Claims. (Cl. 23—184)

This invention relates to the purification of alkali metal hydroxides and is particularly related to the removal of silica from aqueous solutions of sodium hydroxide, such as are prepared by the lime-soda process. Alkali metal hydroxides, particularly those prepared by reacting sodium carbonate with lime, frequently contain undesirable quantities of silica, alumina, and magnesia which render the solutions undesirable. In accordance with the present invention, it has been found that silica can be removed by simultaneously subjecting the solution to the action of an alkaline earth metal compound and an iron compound capable of supplying ferrous iron to the solution. Upon addition of these materials it is found that the two cooperate to precipitate and remove the silica and upon filtration or decantation, the treated liquor contains no silica or only minor amounts thereof. Thus, a solution of sodium hydroxide containing 0.2% to 0.4% of silica, on the anhydrous NaOH basis, may be treated in this manner to produce a solution containing less than 0.1% of silica, on the anhydrous NaOH basis. Various alkaline earth metal compounds may be used such as calcium hydroxide, calcium carbonate, calcium chloride, calcium nitrate, magnesium chloride, barium or strontium hydroxide or carbonate, or other compounds of magnesium, calcium, barium, or strontium, particularly those which are capable of forming the corresponding hydroxide in an alkali metal hydroxide solution. Numerous iron compounds, such as ferrous sulphate, chloride, hydroxide, or other reactive compound may be used for this purpose.

It is found desirable to treat alkali metal hydroxide solutions containing up to 30% of the alkali metal hydroxide. Treatment of solutions of higher concentrations results in the removal of only minor quantities of silica. The temperature of treatment preferably is not less than 70° C. and, in general, it is preferred to conduct the digestion at a temperature in the neighborhood of 90–100° C.

The amount of the calcium compound and ferrous compounds which are required is dependent largely upon the amount of silica in the solution. In general, it is desired to introduce not substantially less than 3.0 moles of the ferrous compound, calculated as ferrous hydroxide, and 8 moles of alkaline earth metal compound, calculated as alkaline earth metal hydroxide, per mole of silica in the solution.

The time of treatment of the solution appears to be of considerable importance. Thus, it is preferred that the digestion be conducted for not substantially less than 2 hours and preferably in excess of 3 hours, in order to secure a satisfactory removal of the silicate.

In order to prevent an undue amount of oxidation of the ferrous compound during the digestion, it is often desirable to prevent contact of the solution with air or other oxidizing agent. This can be done by conducting the digestion in a closed chamber or by bubbling an inert gas such as nitrogen through the solution, thereby preventing any accumulation of oxygen therein. In this way it is possible to minimize the oxidation of the ferrous compound. While some oxidation may be permitted, it is preferred to avoid oxidation of more than 25% of the ferrous compound to the ferric state.

The following example illustrates the invention:

1000 gms. of an aqueous solution of sodium hydroxide containing 12% sodium hydroxide and 0.42% of silica was agitated with 6.5 gms. of calcium hydroxide, and 2.9 gms. of ferrous sulphate at a temperature of 100° C. in a closed vessel, whereby contact of the solution with oxygen was avoided. Samples of the solution were withdrawn periodically, filtered, and analyzed for silica. The agitation was continued for 5 hours. The following table illustrates the silica content of the solution after 2, 3, 4, and 5 hours of agitation at 100° C.

| Time of digestion | Silica content anhydrous, basis |
|---|---|
| Hours | Percent |
| 2 | .015 |
| 3 | .01 |
| 4 | .003 |
| 5 | .0006 |

Although the present invention has been described with reference to specific details of certain embodiments thereof, it is not intended that such details shall be regarded as limitations upon the scope of the invention, except insofar as included in the accompanying claims.

We claim:

1. A method of removing silica from an alkali metal hydroxide solution containing silica in an amount in excess of the amount which will combine with the iron normally present in the solution which comprises introducing a ferrous compound and an alkaline earth metal compound into the solution in a proportion such that the concentration of the ferrous compound is not less than 3 moles, calculated as FeO and the concentration of the alkaline earth metal compound is not substantially less than 8 moles per mole of silica in the solution, and under condition such that no appreciable oxidation of the ferrous compound to a ferric state occurs while digesting the mixture at an elevated temperature, whereby silica is removed from the solution and recovering the purified solution.

2. A method of removing silica from a sodium hydroxide solution containing up to 30 percent sodium hydroxide and silica in an amount in excess of the amount which will combine with the iron normally present in the solution which comprises introducing a ferrous compound and an alkaline earth metal compound into the solution in a proportion such that the concentration of the ferrous compound is not less than 3 moles, calculated as FeO and the concentration of the alkaline earth metal compound is not substantially less than 8 moles per mole of silica in the solution, and under such conditions that no appreciable oxidation of the ferrous compound to a ferric state occurs while digesting the mixture at an elevated temperature, whereby silica is removed from the solution and recovering the purified solution.

3. A method of removing silica from an alkali metal hydroxide solution containing silica in an amount in excess of the amount which will combine with the iron normally present in the solution which comprises introducing a ferrous compound into the solution in a proportion such that the concentration of the ferrous compound is not less than 3 moles, calculated as FeO, per mole of silica in the solution, preventing oxidation of any appreciable quantity of the ferrous compound to a ferric state and digesting the mixture for a period of not less than 3 hours at an elevated temperature in contact with not substantially less than 8 moles of an alkaline earth metal compound per mole of silica, whereby silica is removed from the solution, and recovering the purified solution.

4. A method of removing silica from an alkali metal hydroxide solution containing silica in an amount in excess of the amount which will combine with the iron normally present in the solution which comprises introducing a ferrous compound into the solution in a proportion such that the concentration of the ferrous compound is not less than 3 moles, calculated as FeO per mole of silica in the solution, preventing oxidation of any appreciable quantity of the ferrous compound to a ferric state and digesting the mixture for a period of not less than 4 hours at an elevated temperature in contact with not substantially less than 8 moles of an alkaline earth metal compound per mole of silica, whereby silica is removed from the solution, and recovering the purified solution.

5. In the purification of caustic alkali solutions containing silicate the process which comprises subjecting such solutions to the action of a ferrous compound and a compound of the group consisting of alkaline earth metal hydroxides, oxides, and salts, the ferrous compound being present in an amount sufficient to provide a molecular ratio of FeO to silica of at least 3 to 1, and conducting the treatment under conditions such that no appreciable oxidation of the ferrous compound occurs during treatment whereby silica is removed from the solution and recovering the purified solution.

IRVING E. MUSKAT.
FREDERICK GAGE.